No. 788,172. PATENTED APR. 25, 1905.
C. A. SEILER.
AIR COUPLING.
APPLICATION FILED MAY 24, 1904.

Witnesses
C. H. Walker.
Lewis Hodges.

Inventor
Clayton A. Seiler
By Wm. D. Hodges
Attorney

No. 788,172. Patented April 25, 1905.

UNITED STATES PATENT OFFICE.

CLAYTON A. SEILER, OF WASHINGTON, DISTRICT OF COLUMBIA.

AIR-COUPLING.

SPECIFICATION forming part of Letters Patent No. 788,172, dated April 25, 1905.

Application filed May 24, 1904. Serial No. 209,518.

*To all whom it may concern:*

Be it known that I, CLAYTON A. SEILER, of Washington, in the District of Columbia, have invented certain new and useful Improvements in Air-Couplings; and I do hereby declare the following to be a full, clear, and exact description of the invention, such as will enable others skilled in the art to which it appertains to make and use the same.

This invention relates to certain new and useful improvements in air-couplings, and pertains more particularly to that class of devices employed in coupling air-pumps to the valves of pneumatic tires and the like. Heretofore couplings of this character which have gone into general use have been found objectionable in that the parts quickly wear and become loosened, and said parts being so assembled that they cannot be separated repairs thereof are impossible. Thus when such devices have been in use but a short time it is impossible to effect an air-tight connection with the valve. As a result their utility is destroyed and they become utterly worthless and a total loss.

The object of the present invention is to overcome these objections by providing a coupling device so constructed that the parts may be readily separated and replaced in case of wear or injury.

The invention also has for its object the production of means whereby an air-tight union with a valve-casing can always be readily secured and maintained.

A further object of the invention is to provide means for taking up the wear upon the parts; and a further object is to provide means whereby an air-tight union between the coupling and the pump-tube is secured and at the same time allow of the ready and easy separation of these elements.

The invention will be hereinafter fully set forth, and particularly pointed out in the claims.

Figure 1:
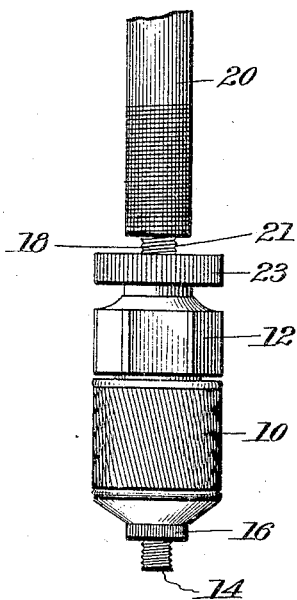
Figure 2:
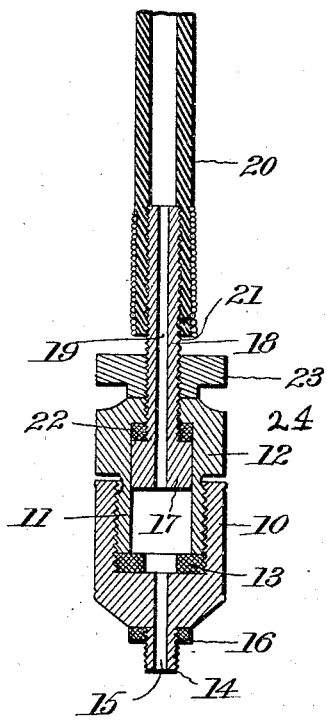

In the accompanying drawings, Figure 1 is a side view illustrating my invention. Fig. 2 is a longitudinal sectional view thereof.

Referring to the drawings, 10 designates a cup-like member provided with internal screw-threads adapted to engage the reduced threaded extension 11 of a sleeve 12, a suitable packing-ring 13 being interposed between the bottom of said cup member and the abutting end of sleeve 12, whereby an air-tight chamber is secured. Said member 10 is provided with a threaded nipple or extension 14, adapted to engage a valve-casing, (not shown,) an air-channel 15 leading from the interior of said cup member 10 through said nipple. If desired, said nipple may be provided with a packing-washer 16 in order to insure an air-tight joint with the valve-casing.

The sleeve 12 is supported upon the headed end 17 of a threaded stem 18, the shank of which is passed through a reduced bore or opening in said sleeve, said stem being provided with a longitudinal bore 19, leading from the interior of sleeve 12 to the flexible tube 20, with which said stem is united. I have found in practice that the threads 21 on the circumference of shank of stem 18 form an excellent substitute for the circular ribs usually employed to unite a rubber tube with a metal nipple and hold equally as well, the same possessing the additional advantage of being readily detached by turning the stem 18 in a reverse direction. The sleeve 12 is normally free to rotate upon the head 17 of stem 18, an air-tight joint being secured by means of a packing-ring 22, interposed between head 17 and the abutting seat therefor in said sleeve. If desired, the exposed portion of said sleeve may be formed with flattened faces, whereby the same may be engaged by a suitable tool in uniting the two members of the body. A clamp nut or disk 23, working on stem 18, is provided with an annular shoulder 24, adapted to be moved into engagement with the outer end of sleeve 12, whereby the parts may be held from rotation.

In practice when it is desired to inflate a tire or the like the nipple 14 is engaged with the valve-casing and screwed home in the usual manner, the member 10 and sleeve 12, forming the body of the coupling, rotating freely upon the head of stem 18. The nut 23 is then screwed down against the abutting end of sleeve 12 and the parts thus brought into air-tight frictional engagement and also securely locked from rotation by this means. Thus accidental disengagement from said valve-casing is prevented and an absolutely air-tight connection secured. To disengage the coupling from the tire or the like, the operator without disturbing the nut 23 turns the coupling in a reverse direction to disengage nipple 14, the effect of which is to also slightly rotate said nut, whereupon the locking action of the latter is destroyed. This disengagement is rendered possible by reason of the stem 18 being held from rotation by tubing 20, whereby a movement of the coupling under force will by reason of its frictional engagement with the nut impart a corresponding movement to the latter sufficient to cause it to ride upward upon the screw-threads to disengage the parts.

The advantages of my improved air-coupling will be readily apparent to those skilled in the art to which it appertains. It will be particularly observed that by making the body portion of separable members repairs may be readily made or parts entirely replaced in the event of wear or injury. It will be further noted that by providing an adjustable union between the members comprising the body of the coupling wear upon the packing and between the parts can always be taken up. It will also be noted that the clamp-nut will not only firmly lock the coupling in engagement with a valve-casing, and thus insure an air-tight union, but it simultaneously takes up all wear between the head of the stem and the seat of the latter against the upper member of the body of said coupling. By providing said nut with an annular engaging shoulder, said nut may be reduced to the minimum diameter necessary to secure a locking leverage. This is of decided anvantage, as couplings of this character must necessarily be compact to fit between spokes of a bicycle or similar wheel. It will be further observed that in uniting the stem of the coupling with the flexible tubing of the pump the threads upon said stem will screw into the inner surface of the rubber or other material and firmly engage the same, forming a close joint that will not readily separate under normal strains. Said parts, however, can be quickly separated by rotating said stem in a reverse direction, the threads of the latter then serving to force same outward. Another advantage lies in the fact that when the flexible tubing is short the clamp-nut holds the parts rigidly in line, thereby preventing the lateral displacement and consequent leakage incident to devices of this character now in general use. My improved coupling device is also simple and inexpensive and being composed of few parts is not liable to readily get out of order or become deranged.

I claim as my invention—

1. A device of the character described comprising a stem provided with a head or enlargement at one extremity, a coupling mounted to rotate upon said stem, packing interposed between the abutting faces of said coupling and said head, and means for locking said coupling from movement and simultaneously compressing said packing to take up any wear thereupon, whereby an air-tight joint is maintained.

2. A device of the character described comprising a threaded stem provided with a head or enlargement at one extremity, a coupling loosely mounted upon said stem, packing interposed between the abutting faces of said coupling and said head, and a lock-nut working on said stem and adapted to lock said coupling from movement and simultaneously compress said packing to take up any wear thereupon, whereby an air-tight joint is maintained.

3. A device of the character described comprising a stem provided with a head or enlargement at one extremity, a coupling mounted to rotate upon said stem, said coupling being formed of separable members, packing interposed between the abutting faces of said coupling and said head, means for locking said coupling from movement and simultaneously compressing said packing to take up wear thereupon, and packing interposed between the abutting portions of the separable members of said coupling.

4. A device of the character described comprising a coupling having an interior chamber, a stem upon which said coupling is loosely mounted and provided with a head located within said chamber and adjacent the upper end thereof, packing interposed between said head and the abutting end of said chamber, and means for locking said coupling from movement and simultaneously compressing said packing to take up wear thereupon.

5. A device of the character described comprising a cup-like member, a sleeve adjustably united thereto, a stem upon which said sleeve is loosely mounted and provided with a head located within said sleeve and adjacent the end wall thereof, packing interposed between said head and the abutting end wall of said sleeve, and a nut working on said stem and adapted to engage the exterior of the end wall of said sleeve, said nut serving to lock said sleeve from movement and simultaneously compress said packing to take up wear thereupon.

In testimony whereof I have signed this specification in the presence of two subscribing witnesses.

CLAYTON A. SEILER.

Witnesses:
J. W. RIDGELY,
CATHERINE HANCOCK.